United States Patent [19]

Dahlgren

[11] Patent Number: 4,887,893

[45] Date of Patent: Dec. 19, 1989

[54] PERISCOPE WITH ONE PIECE HOUSING AND MIRROR HOLDING ELEMENTS

[76] Inventor: Lennart Dahlgren, Askims Utsiktsväg 10, S-436 00, Askim, Sweden

[21] Appl. No.: 166,703

[22] Filed: Mar. 11, 1988

[30] Foreign Application Priority Data

Mar. 13, 1987 [DE] Fed. Rep. of Germany ....... 8703771

[51] Int. Cl.$^4$ .................. G02B 23/08; G02B 23/22
[52] U.S. Cl. .................................. 350/618; 350/540; 446/219
[58] Field of Search ............... 350/540, 541, 542, 543, 350/544, 618, 631, 640; 446/219

[56] References Cited

U.S. PATENT DOCUMENTS

| 1,480,112 | 1/1924  | Poppenhusen ............ 350/618 |
| 2,364,670 | 12/1944 | Stamy et al. ............. 350/618 |
| 2,551,243 | 5/1951  | Campbell ................ 350/618 |
| 2,909,959 | 10/1959 | Girden .................. 350/618 |
| 3,357,777 | 12/1967 | Kallio .................. 350/618 |
| 3,551,032 | 12/1970 | Dunn, Jr. ............... 350/618 |
| 4,344,672 | 8/1982  | Bleiweiss et al. ........ 350/631 |

Primary Examiner—Rodney B. Bovernick
Assistant Examiner—Martin Lerner
Attorney, Agent, or Firm—Ostrolenk, Faber, Gerb & Soffen

[57] ABSTRACT

A periscope, particularly a toy periscope formed of an elongated housing, having at one end portion an inlet opening in one side surface, and at the opposite, second end portion an outlet opening, and two deflection mirrors arranged in the interior of the housing at the two end portions thereof. To facilitate manufacture, the housing is formed of a one piece blow molded plastic material. Mirror holding elements are located in the inlet and outlet openings.

8 Claims, 2 Drawing Sheets

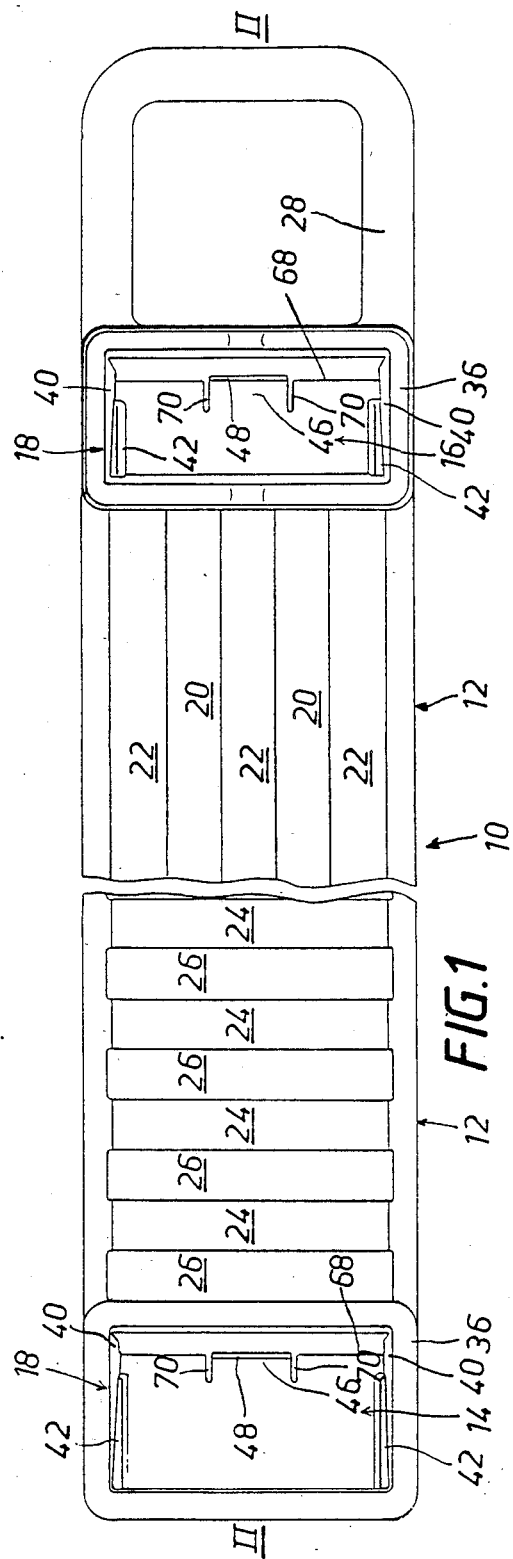
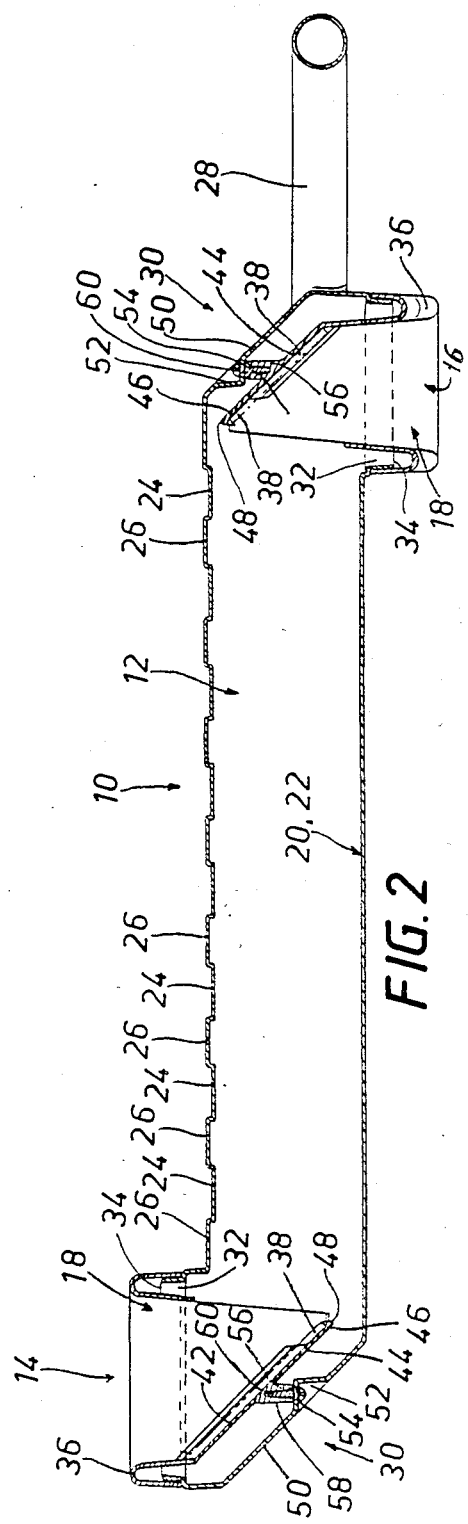

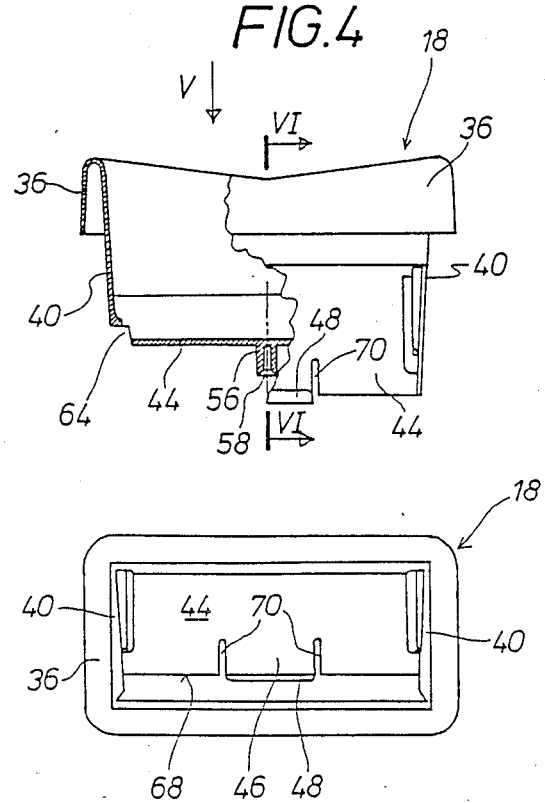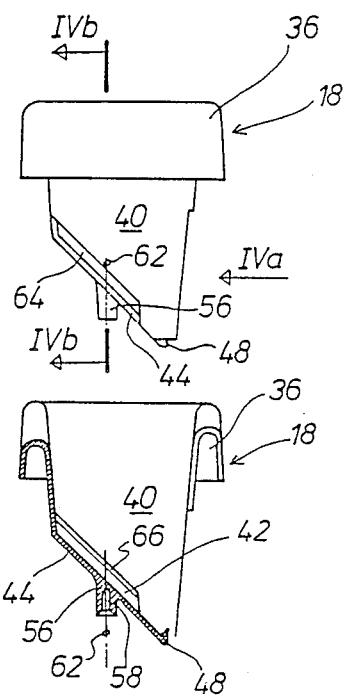

PERISCOPE WITH ONE PIECE HOUSING AND MIRROR HOLDING ELEMENTS

BACKGROUND OF THE INVENTION

1. Field of the Invention

The invention relates to a periscope, particularly a toy periscope with an elongated housing, which at one end portion is designed with an inlet opening in one side surface, and at an opposite, second end portion with an outlet opening. The periscope has two deflection mirrors in the interior of the housing, at the end portions.

2. Description of the Related Art

A toy periscope with a two part housing is known. The two part housing makes it possible to arrange the deflection mirrors in the interior of the housing in a simple and time-saving manner. The two-piece design also facilitates the formation of the inlet and outlet openings. However, mounting the two housing halves together represents a significant manufacturing expense.

SUMMARY OF THE INVENTION

The purpose of the invention is therefore to provide a periscope, particularly a toy periscope of the type mentioned, with reduced mounting and manufacturing costs.

This has been solved by the invention in which a housing consists of a one-piece blow molded plastic material, which is designed with the inlet opening and the outlet opening, and that in each one of the inlet opening and the outlet opening is fitted a mirror holding element with a deflection mirror.

Manufacturing costs are reduced since the step of mounting or joining the housing halves is eliminated. Since the deflection mirrors are in mirror holding elements, it is possible to first arrange the deflection mirrors in the mirror holding elements and to then attach the mirror holding elements, with the deflection mirrors fitted therein, in the openings of the housing. To form the inlet and outlet openings, it is necessary to cut out surface portions from the housing.

Preferably, one of the inlet and outlet openings has a flange projecting from the corresponding side surface of the elongated housing, and the two mirror holding elements engage the corresponding flange. With the flanges projecting above the corresponding side surfaces of the housing, the inlet and outlet openings can be easily produced by cutting through portions of the blow molded housing blank limited by the corresponding flange. Thus, the two flanges define the inlet and outlet openings and facilitate the accurate positioning of the mirror holding elements.

Preferably, each mirror holding element has an inverted collar edge which engages the corresponding flange of the housing. The inverted collar edge accurately centers the mirror holding element, and thereby centers the deflection mirror in the mirror holding element, in relation to the elongated housing. Further, the inverted collar edge acts as an engagement surface for the eye region of a child using the periscope.

Preferably, each mirror holding element has opposed side portions, and the deflection mirror is fixed between the side portions. Preferably, the deflection mirror is fixed between the side portions, in guiding grooves.

Preferably, each mirror holding element has a base portion interconnecting the side portions, which base portion is inclined with respect to the longitudinal axis of the housing. A lower edge of the base portion may be provided with a locking collar. The base portion is preferably inclined at an angle of 45° with respect to the longitudinal axis of the housing. It may serve as a bottom for supporting the deflecting mirror. These features reduce the risk of breaking the mirrors. This is of particular importance, since toy periscopes are often subjected to uncareful handling. The guiding grooves and the locking collar arrest all sides of the deflection mirror within the corresponding mirror holding element.

The lower edge of the base portion preferably has a resilient tongue, provided with the locking collar. The deflecting mirror can be displaced longitudinally in the guiding grooves until the resilient locking collar engages the corresponding flange edge of the deflecting mirror.

Preferably, each mirror holding element has, at its lower side facing away from the mirror, a blind bore, and each end portion of the housing may be provided with a bore which is axially aligned with the blind bore in the collar of the corresponding mirror holding element. A threaded member, e.g., a screw, is inserted through the bore in the housing and is screwed into the blind bore such that the end portion of the housing and the corresponding mirror holding element are mechanically connected. This connection stabilizes each deflection mirror, ensuring correct functioning of the periscope.

Preferably, the bore in the housing is located in an indentation within a bevelled surface of the housing. The bevelled surface is approximately parallel to the associated base portion of the mirror holding element and to the associated deflection mirror. Thus, the head of the screw member is half covered such that the risk of injury from the screw head is eliminated.

Preferably, the elongated housing has a handle at one end portion, formed in one piece of blow molded plastic material with the housing.

The housing may, e.g., consist of blow molded, high density polyethylene. The two mirror holding elements may be formed, e.g., from polypropylene.

Other features and objects of the invention will become apparent from the following detailed description of a preferred embodiment of the invention considered in conjunction with the accompanying drawings.

BRIEF DESCRIPTION OF THE DRAWINGS

FIG. 1 is a side view of a periscope in accordance with the invention. One side of the periscope, with a handle, is illustrated in the right hand side of the Figure, and the opposite side of the periscope is illustrated in the left hand side of the Figure.

FIG. 2 is a cross-sectional view along the line II—II of FIG. 1;

FIG. 3 is a side view of a mirror holding element in accordance with the invention;

FIG. 4 is a partial cross-sectional view seen in the direction of the arrow IVa and along the line IVb—IVb of FIG. 3;

FIG. 5 is a view of the mirror holding element seen in the direction of the arrow V of FIG. 4; and FIG. 6 is a cross-sectional view through the mirror holding element along the line VI—VI of FIG. 4.

DETAILED DESCRIPTION OF THE PREFERRED EMBODIMENT

Referring to FIG. 1, the periscope 10 has a housing 12 of blow molded plastic material, e.g., of blow molded polyethylene, with an inlet opening 14 and an outlet opening 16. A mirror holding element 18 is located in each of the openings 14 and 16. A deflection mirror (not illustrated in FIG. 1) is fitted to each mirror holding element 18. The housing 12 has longitudinal grooves 20 and longitudinal webs 22 on one side. The opposite side of the housing 12 has transverse grooves 24 and transverse webs 26. These grooves 20, 24 and webs 22, 26 reinforce the one-piece housing 12. A handle 28 is integrally formed with the housing 12 at one end thereof.

Referring to FIG. 2, each end portion 30 of the elongated housing 12 has a flange 32. During and immediately after blow molding of the housing 12, the flanges 32 are closed with blown plastic material. After stripping the blank for the housing 12, each flange 32 is cut along its upper edge 34 to form the openings 14 and 16. A mirror holding element 18 is pushed into the openings 14 and 16 in such a manner that its inverted collar edge 36 tightly engages the associated edge or flange 32. Due to the design of each mirror holding element 18 with an inverted collar edge 36 corresponding to the associated flange 32, the deflection mirror 38 is accurately positioned in the mirror holding element 18.

The deflection mirrors 38 are inclined 45° with respect to the longitudinal axis of the housing 12 and are parallel to each other. Guiding grooves 42 are provided for exact correct positioning of the two deflection mirrors 38 in the two side portions 40. Further, a resilient tongue 46 with a locking collar 48 is located in the base portion 44 of each mirror holding element 18. The mirror holding elements 18 are described in more detail below in connection with FIGS. 4-6.

The end portions 30 have bevelled surfaces 50 with indentations 52. Each indentation 52 has a bore 54. The base portion 44 of each mirror holding element 18 has a shoulder 56 at its lower side. The shoulder 56 is equipped with a blind bore 58. The blind bore 58 is aligned with the bore 54. A screw member 60 is screwed in through the bore 54 and into the blind bore 58. The bore 58 need not have threads if a conventional wood screw is used. When a metal screw is used, the bore 58 should be threaded.

FIGS. 3 to 6 show different views of the mirror holding element 18. Reference numeral 36 designates the inverted collar edge, which extends at right angles around the mirror holding element 18 (FIG. 5). The mirror holding element 18 has two opposed side portions 40, which are interconnected at the lower side opposed to the inverted collar edge 36 by a base portion 44 (FIGS. 3 and 6). The base portion 44 is inclined 45° with respect to the central axis 62 of the mirror holding element 18. The area of connection between each side portion 40 and the base portion 44 is provided with a recess 64. Each side portion 40 has a guiding groove 42, the transverse dimension of which corresponds to the thickness of the deflection mirror.

Referring to FIG. 6, a longitudinal web 66 is provided to form each guiding groove 42. The web 66 projects from the side portion 40, whereby the two longitudinal webs 66 of one of the mirror holding elements face each other. The base portion 44 has slots 70 extending from its lower edge 68 (FIG. 5) to define a resilient tongue 46. The resilient tongue 46 has a locking collar 48 for retaining the mirror in the mirror holding element 18 by a resilient snap locking connection, known per se.

A shoulder 56 is shaped at the lower side of the base portion 44. The shoulder 56 includes a bore 58.

Although the invention has been described in relation to a particular embodiment thereof, many other variations and modifications and other uses will become apparent to those skilled in the art. It is preferred, therefore, that the invention be limited not by the specific disclosure herein, but only by the appended claims.

What is claimed is:

1. A toy periscope, comprising:
    (A) an elongated housing formed in one piece of blow molded plastic material, said elongated housing comprising:
        (a) first and second opposite end portions and first and second side surfaces;
        (b) an inlet opening at said first end portion; and
        (c) an outlet opening at said second end portion;
    (B) a first mirror holding element fitted within said inlet opening, and a first deflection mirror within said first mirror holding element; and
    (C) a second mirror holding element fitted within said outlet opening, and a second deflection mirror within said second mirror holding element; and wherein:
    said inlet opening has a flange projecting from said first side surface, said outlet opening having a flange projecting from said second side surface, said first mirror holding element engaging said flange of said inlet opening, said second mirror holding element engaging said flange of said outlet opening; and
    said first mirror holding element has an inverted collar edge engaging said flange of said inlet opening, said second mirror holding element having an inverted collar edge engaging said flange of said outlet opening.

2. A periscope as claimed in claim 1, characterized therein, that the elongated housing at one end portion has a handle, formed integrally with the housing.

3. A toy periscope, comprising:
    (A) an elongated housing formed in one piece of blow molded plastic material, said elongated housing comprising:
        (a) first and second opposite end portions and first and second side surfaces;
        (b) an inlet opening at said first end portion; and
        (c) an outlet opening at said second end portion;
    (B) a first mirror holding element fitted within said inlet opening, and a first deflection mirror within said first mirror holding element; and
    (C) a second mirror holding element fitted within said outlet opening, and a second deflection mirror within said second mirror holding element; and wherein:
    each of said mirror holding elements has opposed side portions, said first deflection mirror being fixedly fitted between said side portions of said first mirror holding element, said second deflection mirror being fixedly fitted between said side portions of said second mirror holding element; and
    said first deflection mirror is held in guiding grooves between said side portions of said first mirror holding element and said second deflection mirror is held in guiding grooves between said side portions of said second mirror holding element.

4. A toy periscope, comprising:
(A) an elongated housing formed in one piece of blow molded plastic material, said elongated housing comprising:
  (a) first and second opposite end portions and first and second side surfaces;
  (b) an inlet opening at said first end portion; and
  (c) an outlet opening at said second end portion;
(B) a first mirror holding element fitted within said inlet opening, and a first deflection mirror within said first mirror holding element; and
(C) a second mirror holding element fitted within said outlet opening, and a second deflection mirror within said second mirror holding element; and wherein:
said first mirror holding element has a base portion and side portions, said base portion interconnecting said side portions of said first mirror holding element, said base portion being inclined with respect to the longitudinal axis of said housing, said base portion having a lower edge with a locking collar; and
said second mirror holding element has a base portion and side portions, said base portion of said second mirror holding element interconnecting said side portions of said second mirror holding element, said base portion of said second mirror holding element being inclined with respect to said longitudinal axis of said housing, said base portion of said second mirror holding element having a lower edge with a locking collar.

5. A periscope as claimed in claim 4, characterized therein, that the lower edge of the base portion has a resilient tongue, which is provided with said locking collar.

6. A periscope as claimed in claim 5, characterized therein, that the base portion of each mirror holding element at the lower side facing away from the deflecting mirror has a shoulder with a bore, and that each end portion of the housing is provided with a bore, which is axially aligned with the bore in the shoulder of the associated mirror holding element.

7. A periscope as claimed in claim 4, characterized therein, that the base portion of each mirror holding element at a lower side facing away from the deflecting mirror has a shoulder with a bore, and that each end portion of the housing is provided with a bore, which is axially aligned with the bore in the shoulder of the associated mirror holding element.

8. A periscope as claimed in claim 7, characterized therein, that the bore in the shoulder is provided in an indentation, which is arranged on a bevelled surface of the housing, whereby the bevelled surface is arranged at least almost parallel to the associated base portion of the mirror holding element and to the associated deflection mirror.

* * * * *